United States Patent [19]
Ishiwata et al.

[11] Patent Number: 6,057,991
[45] Date of Patent: May 2, 2000

[54] THIN FILM MAGNETIC HEAD WITH AN IMPROVED SURFACE TO REDUCE THE OCCURRENCE OF HEAD CRASH

[75] Inventors: Nobuyuki Ishiwata; Tsutomu Ishi; Kiyokazu Nagahara; Kazumasa Kumagai, all of Tokyo, Japan

[73] Assignee: NEC Corporation, Tokyo, Japan

[21] Appl. No.: 08/978,586

[22] Filed: Nov. 26, 1997

[30] Foreign Application Priority Data

Nov. 26, 1996 [JP] Japan ................................ 8-314662

[51] Int. Cl.⁷ ........................... G11B 5/39; G11B 5/187
[52] U.S. Cl. .......................................... 360/113; 360/122
[58] Field of Search .................................. 360/113, 126, 360/122

[56] References Cited

U.S. PATENT DOCUMENTS 5,726,841  3/1998  Tong ........................................ 360/122

FOREIGN PATENT DOCUMENTS

| 2244413 | 9/1990 | Japan . |
| 3296907 | 12/1991 | Japan . |
| 5159236 | 6/1993 | Japan . |
| 6195642 | 7/1994 | Japan . |
| 7-262519 | 10/1995 | Japan . |
| 10-55506 | 2/1998 | Japan . |
| 10-69608 | 3/1998 | Japan . |

OTHER PUBLICATIONS

Y. Yoshida et al., "Edge Eliminated Head", *IEEE Transactions on Magnetics*, vol. 29, No. 6, Nov. 1993, pp. 3837–3839.

Robert P. Hunt, "A magnetoresistive Readout Transducer", *IEEE Transactions on Magnetics*, vol. Mag–7, No. 1, Mar. 1971, pp. 150–154.

*Primary Examiner*—A. J. Heinz
*Attorney, Agent, or Firm*—Sughrue, Mion, Zinn, Macpeak & Seas, PLLC

[57] ABSTRACT

Disclosed is a merged head device which has: a slider main body with an air bearing surface to a magnetic medium; two magnetic shield films which are parallel disposed on a common plane with a predetermined interval and orthogonal to air flow on the downstream side of the air bearing surface of the slider main body; a magnetoresistive effect head which is disposed through a magnetic separating layer of an insulator between the two magnetic shield films; an inductive head which is composed of one magnetic pole film corresponding to one of the two magnetic shield films which is located downstream and the other magnetic pole film which is disposed through a magnetic gap on the other side of the one magnetic pole film where the magnetoresistive effect head does not exist, and recording is conducted by magnetic field which generates at the magnetic gap; and concave portions which are formed on both sides of the other magnetic pole film along the direction of the air flow on the air bearing surface of the slider main body so as to define a width of the other magnetic pole film; wherein the concave portions are filled with a non-magnetic material.

6 Claims, 8 Drawing Sheets

- 11 SLIDER MAIN BODY
- 13 ONE MAGNETIC SHIELD
- 14 OTHER MAGNETIC SHIELD
- 15B CONCAVE PORTION
- 15 OTHER MANETIC POLE FILM
- 12 DEVICE-PROTECTING ALUMINA
- 15A CONCAVE PORTION

- 7 ALUMINA FILM
- 5A CENTER REGION (5Aa, 5Ab, 5Ac)
- 5C END REGION (5Cb, 5Ca)
- 5 MR ELEMENT
- 6 ALUMINA FILM
- 5B END REGION (5Bb, 5Ba)

FIG.12
STEP1
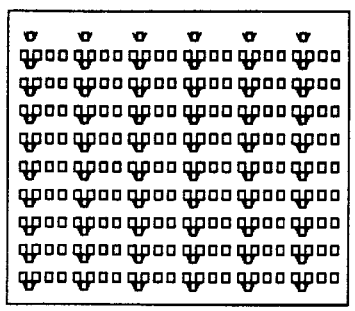
STEP2
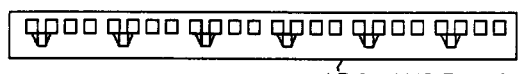
ABS SURFACE
STEP3
ABS SURFACE
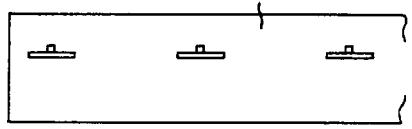
STEP4
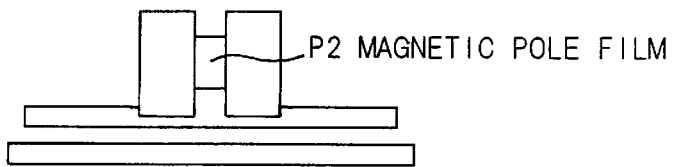
P2 MAGNETIC POLE FILM
STEP5
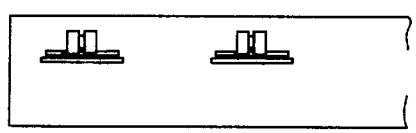
STEP6
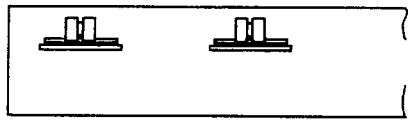
STEP7
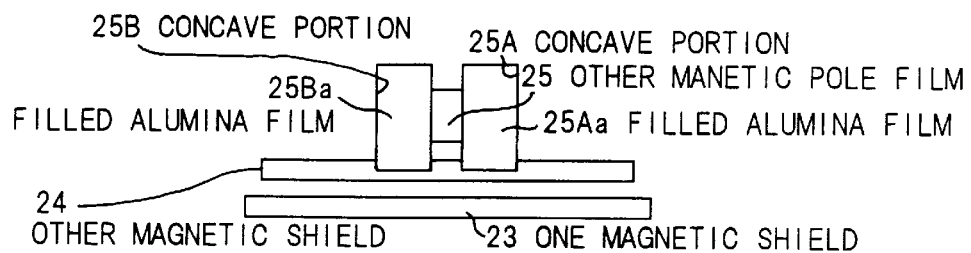
25B CONCAVE PORTION  25A CONCAVE PORTION
25Ba  25 OTHER MANETIC POLE FILM
FILLED ALUMINA FILM  25Aa FILLED ALUMINA FILM
24 OTHER MAGNETIC SHIELD  23 ONE MAGNETIC SHIELD

THIN FILM MAGNETIC HEAD WITH AN IMPROVED SURFACE TO REDUCE THE OCCURRENCE OF HEAD CRASH

FIELD OF THE INVENTION

This invention relates to a merged head device which is composed of a reproducing head employing magnetoresistive effect and an inductive head employing an inductive recording manner, and relates to a method for making such a merged head device.

BACKGROUND OF THE INVENTION

According as a magnetic recording medium is miniaturized and its recording capacity is increased, the relative velocity between a readout magnetic head and the magnetic recording medium (magnetic disk) has been reduced. Thus, a magnetoresistive head (hereinafter referred to as 'MR head') has attracted attention since its reproduction power does not depend on velocity. Such a MR head is discussed in R. P. Hunt et al., "A Magnetoresistive Readout Transducer", IEEE Trans. on Magn., Vol.MAG-7, No. 1, pp. 150–154(1971).

Known as a most practical MR head device is a magnetoresistive merged head (or merged head device) with both a MR head and an inductive head.

In such a merged head device, the MR head with a reproducing function is, as shown in FIGS. 1 and 2, composed of two strip-shaped magnetic shield films 53, 54 which are parallel disposed on a common plane and are opposite to a magnetic recording medium (magnetic disk, not shown), and a magnetoresistive effect element (not shown) which is located through a magnetic separation layer of an insulator between the two magnetic shield films 53, 54.

Also, the inductive head (hereinafter referred to as 'ID head') is, as shown in FIGS. 1 and 2, composed of one magnetic pole film which corresponds to the other magnetic shield film 54 of the two magnetic shield films 53, 54, and a coil (not shown) to be sandwiched by an insulator and the other magnetic pole film 55 which are formed parallel with one magnetic pole film 54 on a plane on the other side of the magnetic pole film 54 (other magnetic shield film) where the magnetoresistive effect element does not exist. Thus, the recording is conducted by magnetic field which generates at a magnetic gap $G_{ID}$ to be given between the magnetic pole films 54, 55. Herein, 51 is a slider main body and 52 is aluminum film for protecting the device. Also, 55A, 55B are concave portions disposed on both sides of the other magnetic pole film 55.

In merged head devices where a MR head and an ID head are layered, there is a problem that the positions of these two heads and the gap may be relatively varied due to a failure in alignment on photolithography in fabrication process.

Further, in merged head devices, there occurs rather a big side-fringing magnetic field during recording. This magnetic field is formed by the leakage of magnetic flux to one magnetic pole film 54 caused by that the width of the other magnetic pole film 55 is greater than that of one magnetic pole film 54.

Also, due to the side-fringing magnetic field, a minimum track width to be achieved is limited and an upper limit of track density is thereby limited. Thus, to achieve a high-density recording by using a merged head device, the minimizing of side-fringing magnetic field is necessary.

In conventional ID head devices for recording and reproducing, the side-fringing magnetic field is reduced to be minimum since respective planes to define a track width on a plane opposite to a recording medium (air bearing surface plane, hereinafter referred to as 'ABS plane') of magnetic pole films 54, 55 are formed to substantially coincide with each other, i.e., to give a common plane.

However, in the merged head devices, one magnetic pole film 54 has to have a width much greater than that of the other magnetic pole film 55 to define a track width so as to shield the MR element. Therefore, such a wide phase causes the side-fringing magnetic flux extending laterally beyond the width of the other magnetic pole film 55.

Japanese patent application laid-open No. 7-262519 (1995) discloses a method for reducing the side-fringing magnetic field like the conventional ID head devices. In this method, as shown in FIG. 3, there is provided a protruded magnetic pole 54a which has a plane orthogonal to the surface of one magnetic pole 54 as well as being parallel with the surface of one magnetic pole 54 and having the same width as the other magnetic pole 55 and are magnetically connected to one magnetic pole (other magnetic shield) 54, between one magnetic pole (=other magnetic shield) 54 of a recording ID head and magnetic gap $G_{ID}$. Thus, a recording magnetic field is generated between the protruded magnetic pole 54a and the other magnetic pole 55. Therefore, the side-fringing magnetic flux can be suppressed like the conventional ID head devices.

In FIG. 3, 64 is a MR head, 65 and 66 are end regions of the MR head 64. Also, 64A and 64B are an upper gap and an lower gap, respectively of the MR head 64.

A method of making the protruded magnetic pole 54a will be explained in FIGS. 4A to 4D.

First, the magnetic gap G is formed on one magnetic pole 54 (P1) also used as the other magnetic shield of the MR head 64, and then a magnetic shield P2 with a predetermined width is formed by frame plating to be defined by photoresist frames 74, 75. Then, by using this magnetic shield P2 as a mask, one magnetic pole 54 is etched by a desired depth by ion beam milling, thereby forming the protruded magnetic pole P3 (54a). In this case, by setting optimally an angle of ion beam B, the magnetic pole P2 and protruded magnetic pole P3 (54a) can be formed to be orthogonal to one magnetic pole 54 (P1).

Also, by providing the protruded magnetic pole P3 (54a) with a desired height, the recording magnetic flux can be substantially defined between the protruded magnetic pole P3 (54a) and the other magnetic pole P2 (55), thereby reducing the side-fringing like the conventional ID head devices.

Thus, in the above method of making the merged head device, the ion beam milling is used to form the protruded magnetic pole P3 (54a) As the milling proceeds, the film thickness of the other magnetic pole P2 (55) decreases since the magnetic pole P2 (55) functions as a mask. Namely, to obtain a desired film thickness of the other magnetic pole P2 (55) when the protruded magnetic pole P3 (54a) is formed, it is necessary that a decrease in the film thickness of the other magnetic pole P2 (55) due to the ion beam milling is previously estimated.

Also, in the this method, the photoresist frames 74, 75 need to have a height much greater than a conventional one so as to form the initial magnetic pole (other magnetic pole) P2 (55) by frame plating. Namely, the film thickness of the other magnetic pole P2 (55) after milling is reduced. Therefore, the other magnetic pole P2 (55) before milling needs to have a much greater film thickness.

On the other hand, when the height of the frames 74, 75 is increased to get a sufficient film thickness, it generally becomes difficult to narrow the frame interval. In Japanese patent application laid-open No. 7-262519, the limit of the frame interval is reported to be 2 μm. In other words, the method disclosed in Japanese patent application laid-open No. 7-262519 is difficult to give a merged head device for high-density recording with a track width less than 2 μm.

As described above, in the merged head device composed of MR head and ID head, there is a problem that the head with a narrower track width is difficult to fabricate, while it solves a failure in alignment of MR head and ID head and side-fringing of recording magnetic field in ID head.

To solve this problem, there is proposed a method that the width control of the magnetic pole 55 (P2) and formation of the magnetic pole 54a (P3) are conducted by ion beam etching from the ABS plane, without controlling the width of the magnetic pole 55 (P2) of ID head and forming the magnetic pole 54a (P3) with the same side surface as the magnetic pole 55 (P2) on the magnetic pole 54 (P1) by wafer treatment.

In this regard, M. Yoshida et al., "Edge Eliminated Head", IEEE Trans. on Magn., Vol.29, No.6, pp.3837–3839 (1993) reports a method that ion beam etching from ABS plane is conducted to suppress undershoots in the readback signal of inductive thin film heads.

However, when this method is applied to a head for high-density recording, such as a merged head of MR head and ID head, dust may be frequently caught in a concave portion formed by ion beam etching since the clearance between head and medium is very short. In the worst case, it may cause a head crash.

SUMMARY OF THE INVENTION

Accordingly, it is an object of the invention to provide a merged head device where a failure in alignment of a MR element and a ID element can be effectively corrected and the production yield can be thereby improved.

It a further object of the invention to provide a merged head device which has a good side-fringing characteristic.

It is a still further object of the invention to provide a merged head device where the occurrence of head crash can be effectively reduced.

It is a still yet further object of the invention to provide a method for making a merged head device mentioned above.

According to the invention, a merged head device, comprises:

a slider main body with an air bearing surface to a magnetic medium;

two magnetic shield films which are parallel disposed on a common plane with a predetermined interval and orthogonal to air flow on the downstream side of the air bearing surface of the slider main body;

a magnetoresistive effect head which is disposed through a magnetic separating layer of an insulator between the two magnetic shield films;

an inductive head which is composed of one magnetic pole film corresponding to one of the two magnetic shield films which is located downstream and the other magnetic pole film which is disposed through a magnetic gap on the other side of the one magnetic pole film where the magnetoresistive effect head does not exist, and recording is conducted by magnetic field which generates at the magnetic gap; and concave portions which are formed on both sides of the other magnetic pole film along the direction of the air flow on the air bearing surface of the slider main body so as to define a width of the other magnetic pole film;

wherein the concave portions are filled with a non-magnetic material.

According to another aspect of the invention, a method for making a merged head device, comprises the steps of:

forming two magnetic shield films which are close and parallel disposed on a wafer of composite ceramics composed of alumina and titanium carbide and a magnetoresistive effect unit composed of a magnetoresistive effect element which is disposed through a magnetic separating layer of an insulator between the two magnetic shield films;

forming an inductive head unit which is composed of one magnetic pole film corresponding to one of the two magnetic shield films, the other magnetic pole film and a coil to be sandwiched by an insulator which are disposed on the other side of the one magnetic pole film where the magnetoresistive effect head does not exist, and recording is conducted by magnetic field which generates at a magnetic gap to be given between the two magnetic shield films;

cutting off the wafer into a bar shape;

polishing a medium opposing plane of the bar cut off;

forming concave portions on both sides of the other magnetic pole film so as to define a width of the other magnetic pole film exposed on the medium opposing plane;

forming alumina film to be buried into the concave portions;

polishing the medium opposing plane on which non-magnetic film is formed so as to define a depth of the magnetoresistive effect element and the magnetic pole films from the medium opposing plane; and processing a slider after completely burying the concave portions.

BRIEF DESCRIPTION OF THE DRAWINGS

The invention will be explained in more detail in conjunction with the appended drawings, wherein:

FIG. 12 is illustrations showing a method of making the merged head device in the second preferred embodiment.

DESCRIPTION OF THE PREFERRED EMBODIMENTS

Figure 5:
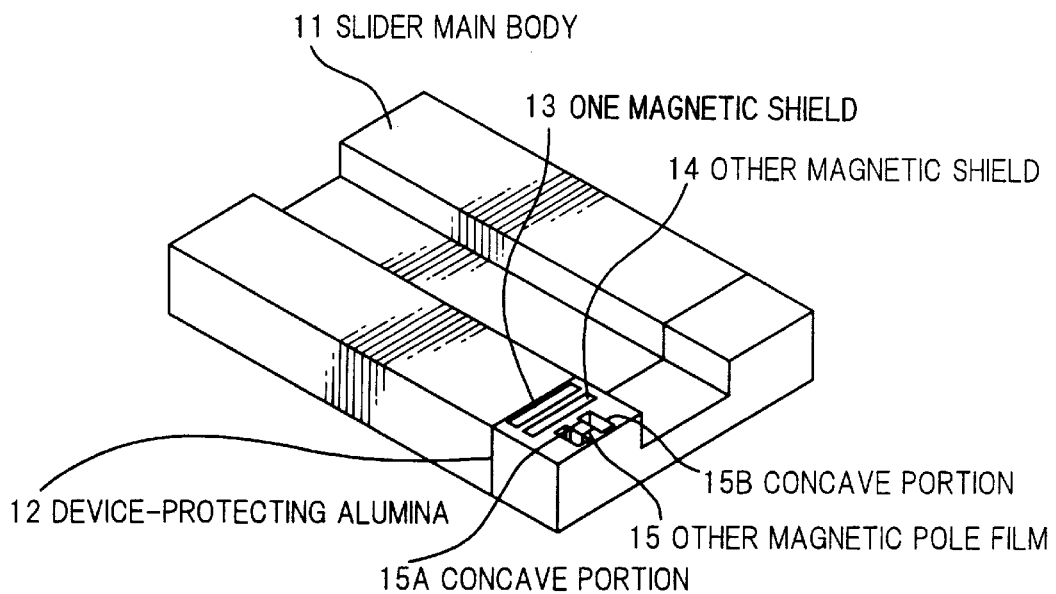
FIG. 5 is a perspective view showing a merged head device in a first preferred embodiment according to the invention.
Figure 6:
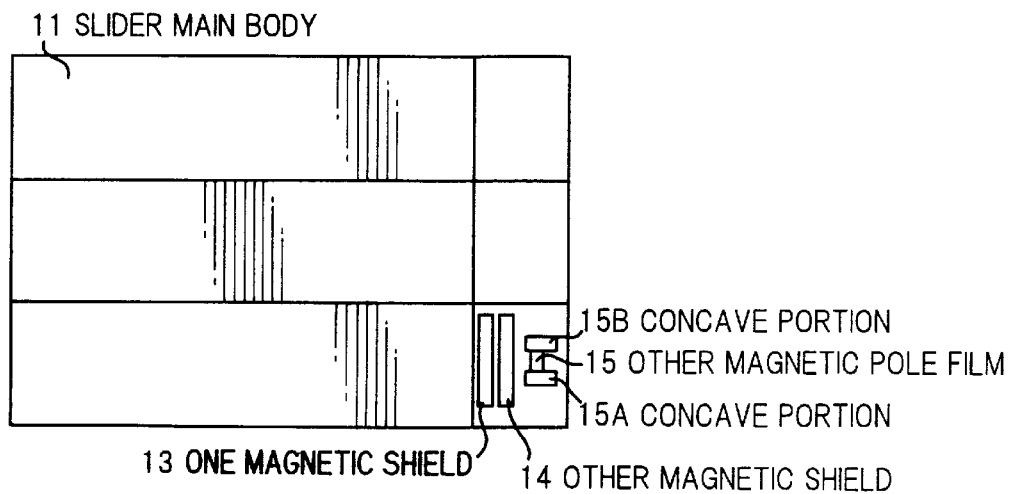
FIG. 6 is a top view showing the merged head device in FIG. 5.
Figure 7:
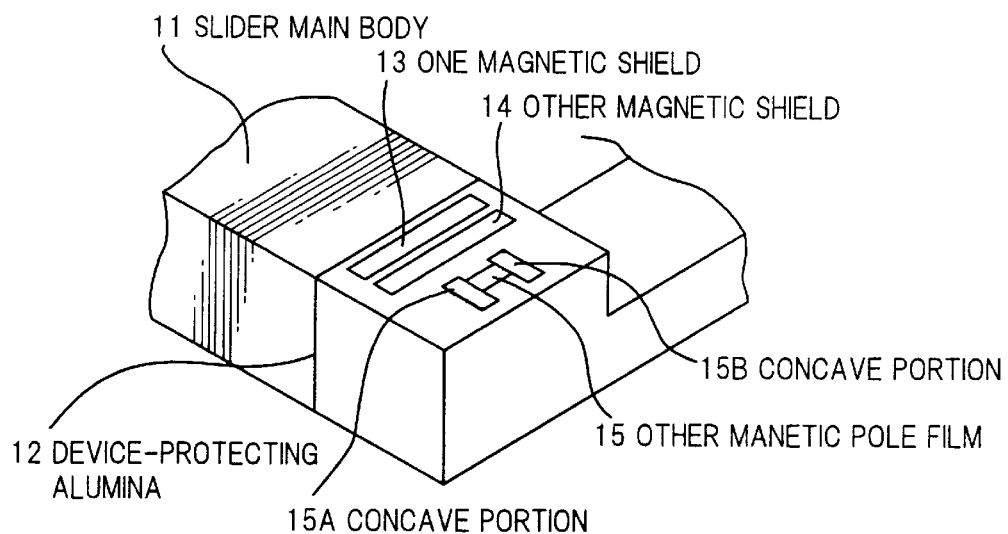
FIG. 7 is an enlarged view showing head elements in FIG. 5.

A merged head device and a method for making the merged head device in the first preferred embodiment will be explained in FIGS. 5 to 9. FIG. 5 is a perspective view showing a slider main body where a merged head device composed of a MR head and an ID head in the first embodiment is mounted, which is viewed from ABS plane which is opposite to a magnetic recording medium (magnetic disk). FIG. 6 is a plan view showing an air bearing surface (ABS). FIG. 7 is an enlarged perspective view showing the merged head device in FIG. 5.

In FIG. 5, 11 is a slider main body which is of composite ceramics composed of alumina and titanium carbide. 12 is alumina film covering the entire region where a MR element etc. are mounted, and 13 and 14 are magnetic shield films for the MR element. 13 corresponds to one magnetic shield film and 14 corresponds to the other magnetic shield film. These magnetic shield films 13, 14 are of NiFe alloy (permalloy) and the thicknesses of magnetic shield films 13 and 14 are set to be 2 $\mu$m and 3 $\mu$m, respectively. There is disposed a MR element 5 as shown in FIG. 8 between the magnetic shield films 13, 14.

Figure 8:
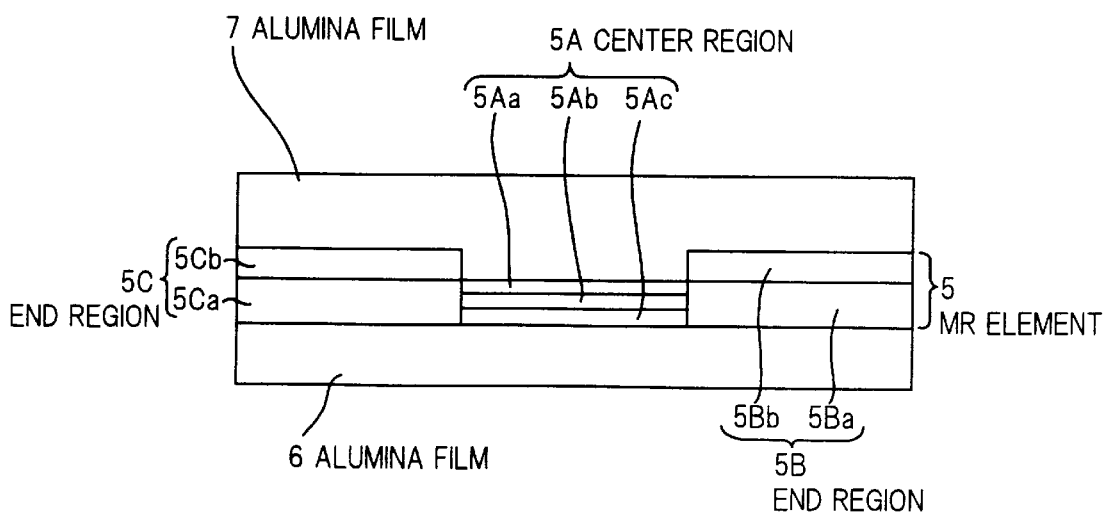
FIG. 8 is an illustration showing a magnetoresistive effect head of the merged head device in the first embodiment.

The MR element 5 is, as shown in FIG. 8, composed of a center region 5A as a magnetic sensing portion, and end regions 5B, 5C which have functions to supply the center region 5A with a current and a vertical bias. The center region 5A of the MR element 5 is composed of MR effect film 5A$a$ which has MR effect and is of 10 nm thick NiFe film, horizontal bias applying film 5A$b$ which is provided for applying a horizontal bias to the MR effect film 5A$a$ and is of 15 nm thick CoZrMo film, and magnetic separating film 5A$c$ which is provided for magnetically separating the NiFe film and the CoZrMo film and is of 7 nm thick Ta film. As shown in FIG. 8, the horizontal bias applying film (CoZrMo film) 5A$b$, magnetic separating film (Ta film) 5A$c$ and MR effect film (NiFe film) 5A$a$ are layered in this order from the bottom.

The width of the center region 5A of the MR element 5 in FIG. 8 is set to be 0.8 $\mu$m. Also, the end regions 5B, 5C are electrically connected to the center region 5A. The end region 5B is composed of vertical bias supplying film (CoPtCr film) 5B$a$ for supplying a vertical bias with the MR effect film 5A$a$ of the center region 5 and central current supplying film (Au film) 5B$b$ for supplying the center region 5A with a current. The end region 5C is composed of vertical bias supplying film (CoPtCr film) 5C$a$ for supplying a vertical bias with the MR effect film 5A$a$ of the center region 5 and central current supplying film (Au film) 5C$b$ for supplying the center region 5A with a current.

Here, the thickness of the vertical bias supplying films (CoPtCr films) 5B$a$, 5C$a$ are set to be 25 nm. Further, the MR element 5 composed of the center region 5A and end regions 5B, 5C is isolated by alumina films 6, 7 from the magnetic shield films 13, 14. In this example, the thicknesses of the alumina films 6, 7 are 90 nm and 65 nm, respectively.

In this embodiment, the other magnetic shield film 14 is also used as one magnetic pole film of the ID head. Corresponding to the other magnetic shield film 14 as one magnetic pole of the ID head, the other magnetic pole film 15 of NiFe is formed through the magnetic gap $G_{ID}$ of alumina. The width of the other magnetic pole film 15 longitudinally along the other magnetic shield film (one magnetic pole film) 14 is controlled to be 1.1 $\mu$m by concave portions 15A, 15B which are formed on both sides of the other magnetic pole film 15.

In the concave portions 15A, 15B formed on both sides of the other magnetic pole film 15, alumina films 15A$a$, 15B$a$ are buried. The concave portions 15A, 15B where the alumina films 15A$a$, 15B$a$ are buried are 1 $\mu$m in depth, 2 $\mu$m in width and 4 $\mu$m in height in the thickness direction of the magnetic pole film 15. Also, the thickness of the other magnetic pole film 15 is 3.5 $\mu$m and the gap length of the magnetic gap $G_{ID}$ is 0.25 $\mu$m.

About 2 $\mu$m behind from the ABS plane of one magnetic pole film (other magnetic shield film) 14 and the other magnetic pole film 15, there is formed a Cu coil (not shown) which is isolated by a photoresist material. By flowing a current through the Cu coil, a recording magnetic field is generated at the magnetic gap $G_{ID}$.

A method of the merged head device in the first embodiment will be explained in FIG. 9.

Figure 9:
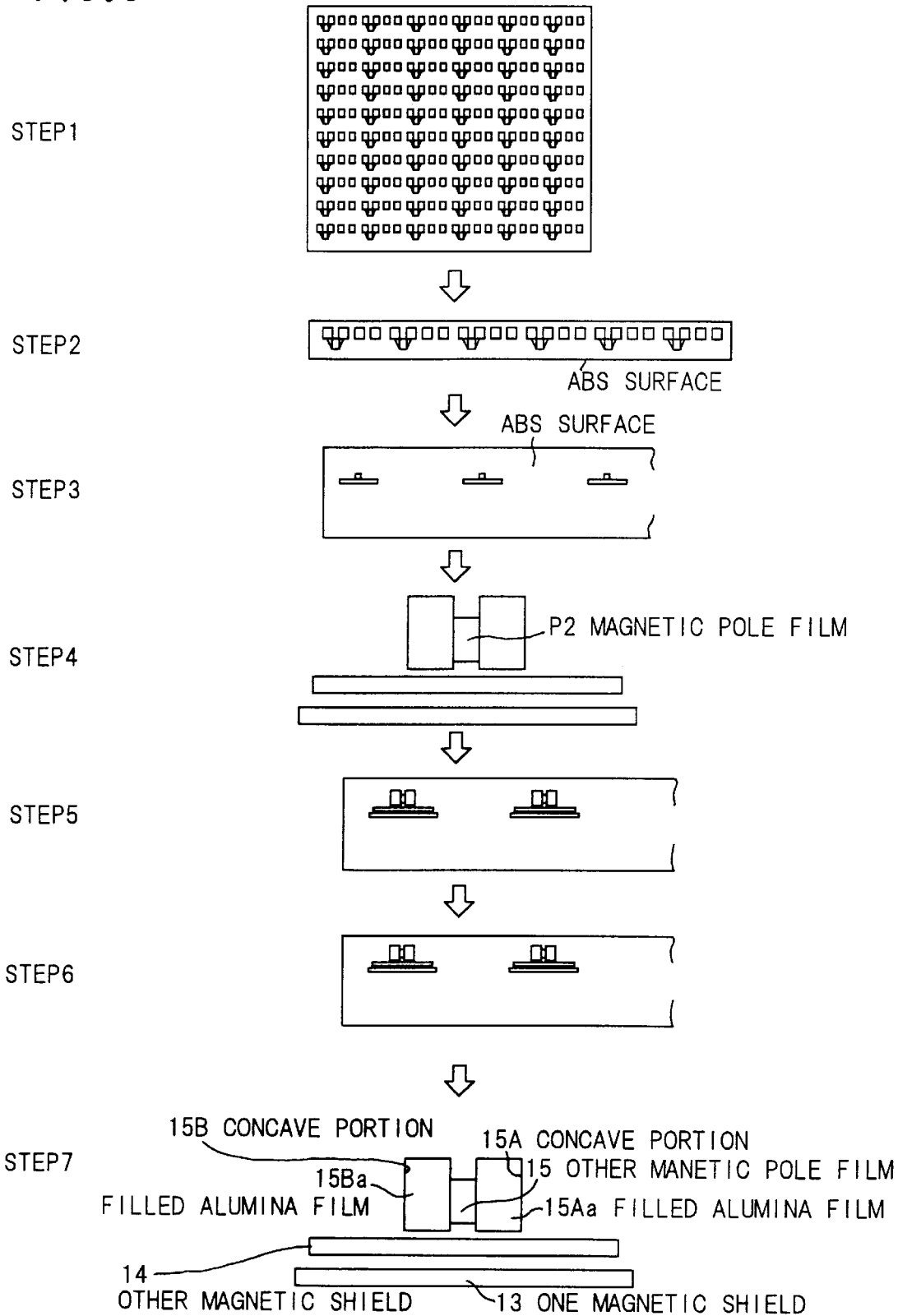
FIG. 9 is illustrations showing a method of making the merged head device in the first preferred embodiment.

In FIG. 9, Step 1 shows a wafer process. In this wafer process, on a wafer composed of composite ceramics (hereinafter referred to as 'altic') of alumina and titanium carbide, the two magnetic shield films 13, 14 which are close disposed and a MR unit composed of the MR element 5 which is disposed through the magnetic separating layer of an insulator between the two magnetic shield films 13, 14 are formed.

Also formed in the wafer process (Step 1) is a ID element where the other magnetic shield film 14 of the two magnetic shield films 13, 14 is used as one magnetic pole film, the coil to be sandwiched by an insulator and the other magnetic pole film 15 are formed parallel with one magnetic pole film 14 on a plane on the other side of the magnetic pole film 14 where the MR element 5 does not exist, and the recording is conducted by magnetic field which generates at the magnetic gap $G_{ID}$ to be given between one magnetic pole film 14 and the other magnetic pole film 15.

After Step 1, as shown in FIG. 9, Step 2 (bar cutting process) where the wafer is cut off to form into a bar, Step 3 (ABS surface rough polishing process) where a surface of the bar opposite to the medium is polished, and Step 4 (concave portion forming process) where the concave portions 15A, 15B for controlling the width of the other magnetic pole film 15 exposed to the medium opposing surface are formed on both sides of the magnetic pole film 15 are conducted in this order.

In this embodiment, the concave portion forming process in Step 4 is conducted by using focused ion beam (FIB) since it needs a high precision.

Further, as shown in FIG. 9, Step 5 (concave portion burying film forming process) where alumina films (filled alumina films) 15A$a$, 15B$a$ to be buried into the concave portions 15A, 15B are formed, and then Step 6 (pole height lapping process) where the ABS surface on which non-magnetic film is formed is polished to define a depth of the MR element 5 and the other magnetic pole film 15 from the medium opposing surface are conducted. Then, in Step 7, completely burying the concave portions 15A, 15B, thereafter the slider is processed. Thereby, the merged head device in FIG. 5 is obtained.

Figure 1:
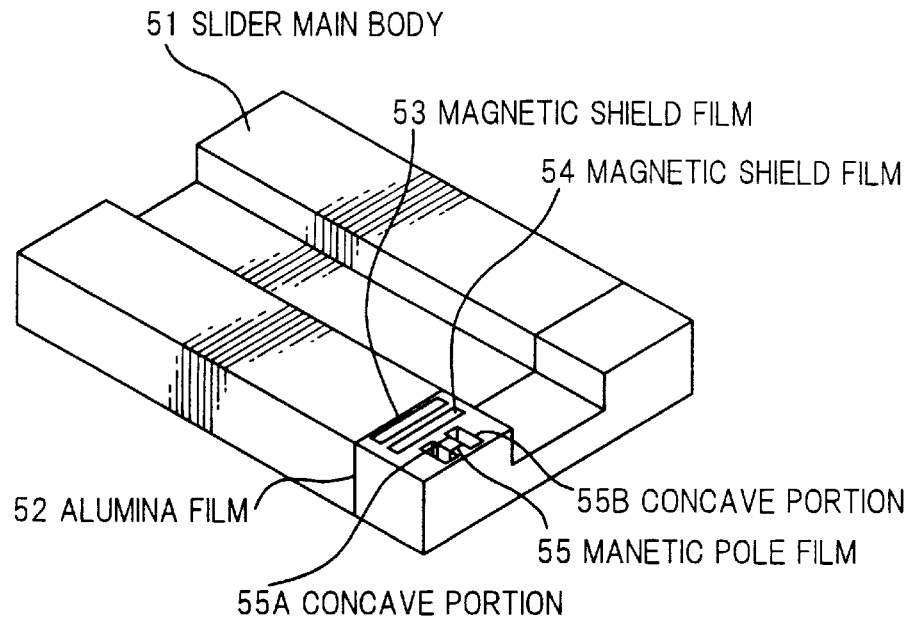
FIG. 1 is a perspective view showing a conventional merged head device, which is viewed from its air bearing surface (ABS)
Figure 2:
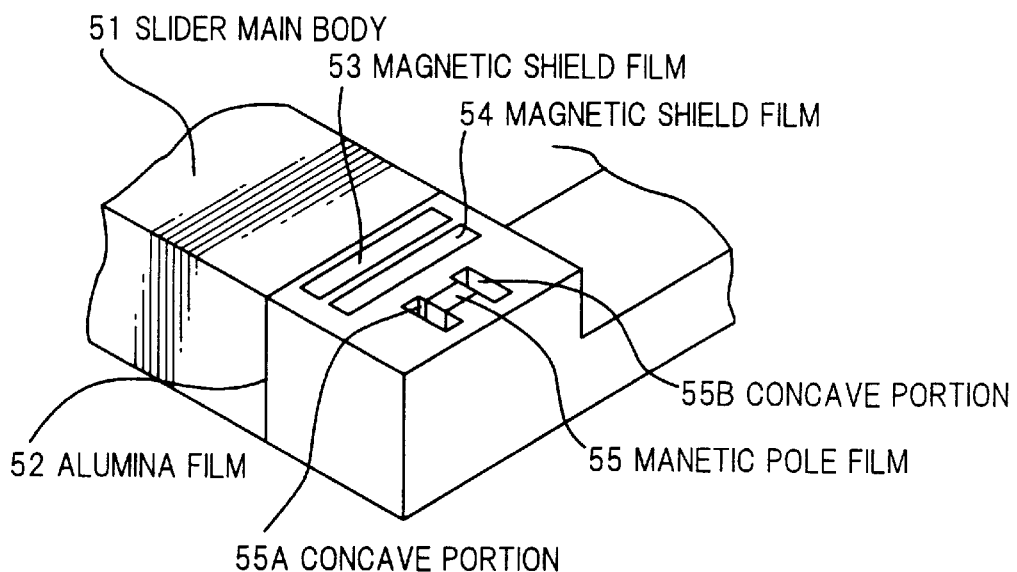
FIG. 2 is an enlarged view showing head elements in FIG. 1.
Figure 3:
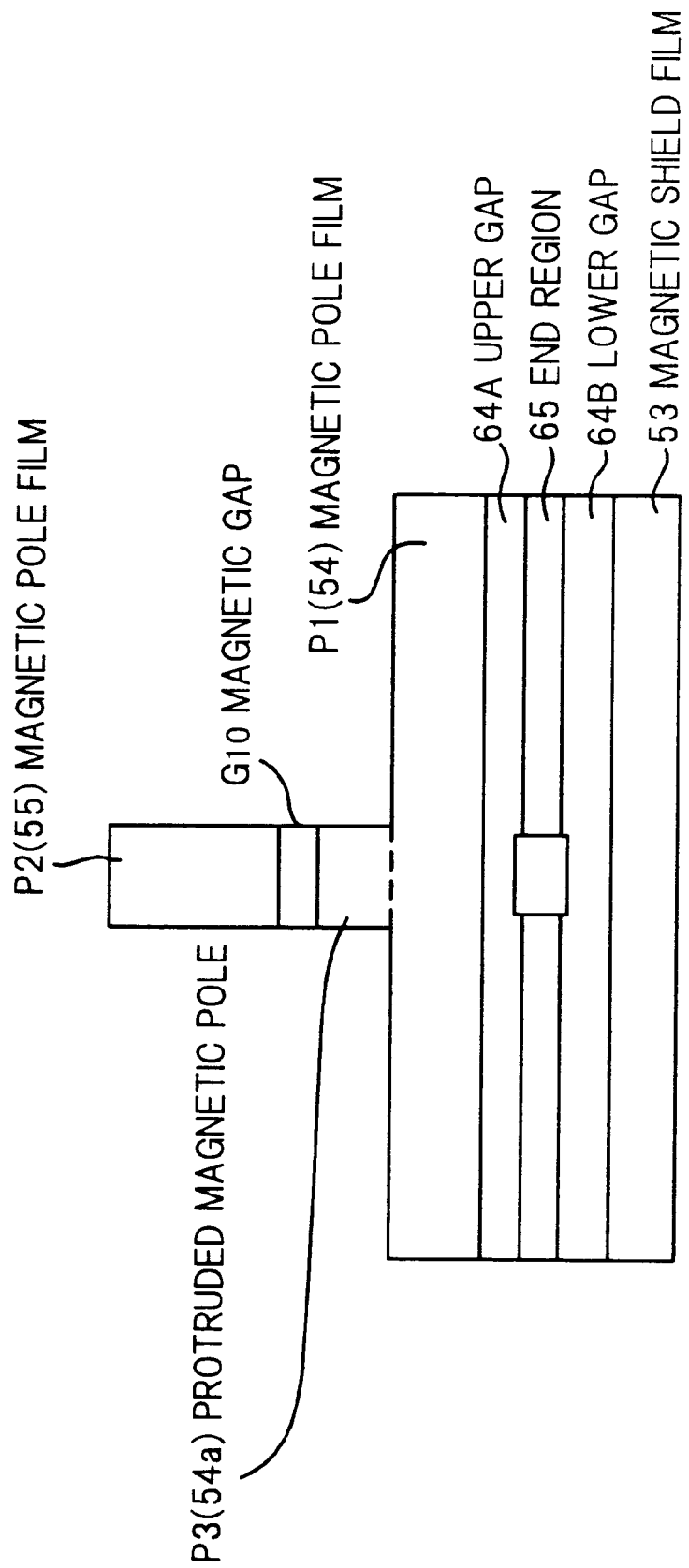
FIG. 3 is an illustration showing head elements of another conventional merged head device.
Figure 4A:
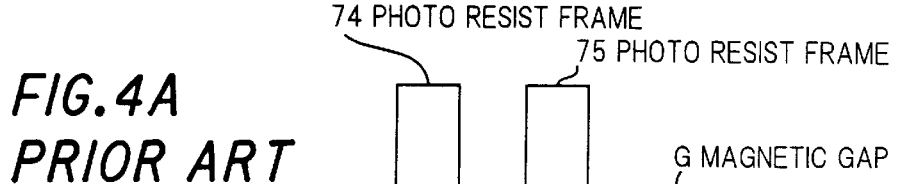
FIGS. 4A to 4D are illustrations showing a method of making the merged head device in FIG. 3.
Figure 4B:
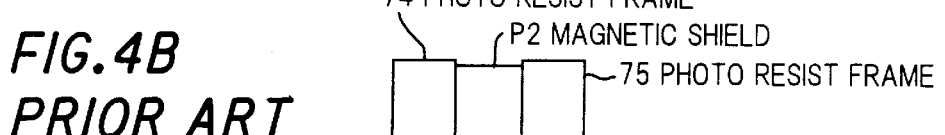
Figure 4C:
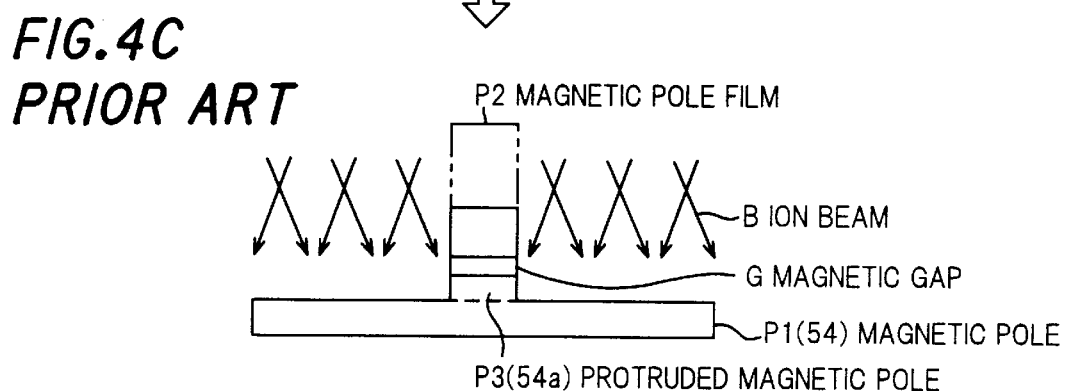
Figure 4D:
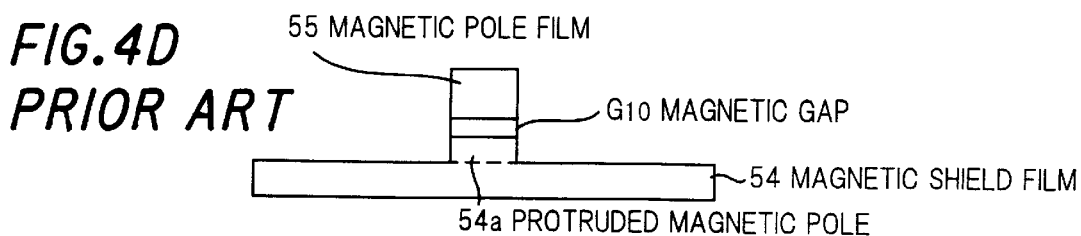

The recording and reproducing characteristics of the merged head device in the first embodiment are tested as compared with the case (prior art in FIG. 1) that no filler including the filled alumina film is buried into the concave portions 15A, 15B on both sides of the other magnetic pole film 15. In the merged head device of the first embodiment, a good narrow track recording characteristic can be obtained by the other magnetic pole film 15 which is defined to a narrow width by forming the concave portions. Also, by the concave portions 15A, 15B on both sides of the other magnetic pole film 15, a failure in alignment of the MR element and ID element can be corrected, thereby improving the production yield.

In the conventional merged head device where no filler is buried into the concave portions 15A, 15B, the recording characteristic is equal to that of the merged head device in the first embodiment. However, the ABS surface tends to be contaminated and a head crash occurs frequently since a medium lubricant or micro particles are caught in the concave portions formed on the magnetic pole end. On the contrary, in the first embodiment, though the clearance between the ABS surface and the magnetic medium is so narrow applying to high-density recording, the ABS surface is hard to be contaminated. Therefore, the occurrence of head crash can be prevented effectively.

Furthermore, a merged head device in the second preferred embodiment will be explained in FIGS. 10 to 12.

Figure 10:
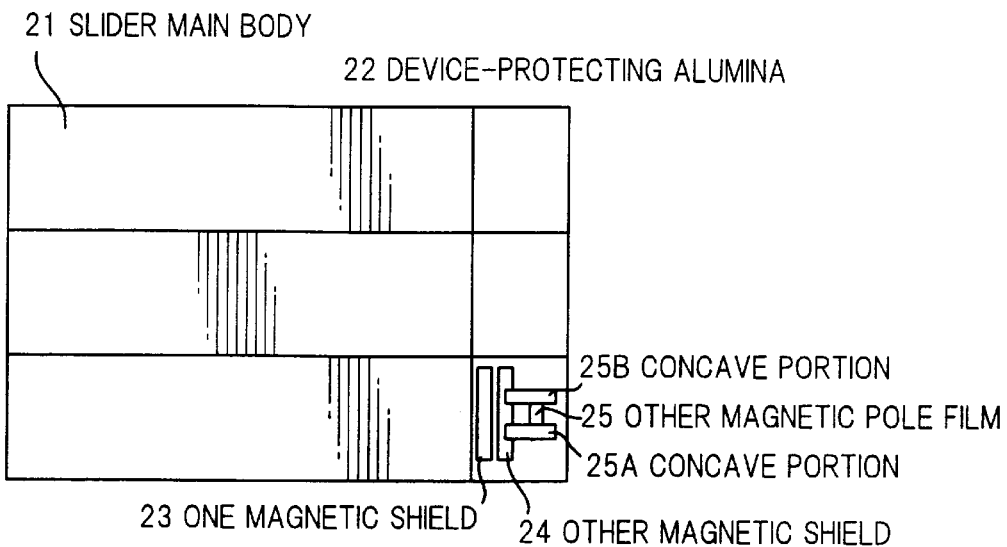
FIG. 10 is a top view showing a merged head device in a second preferred embodiment according to the invention.
Figure 11:
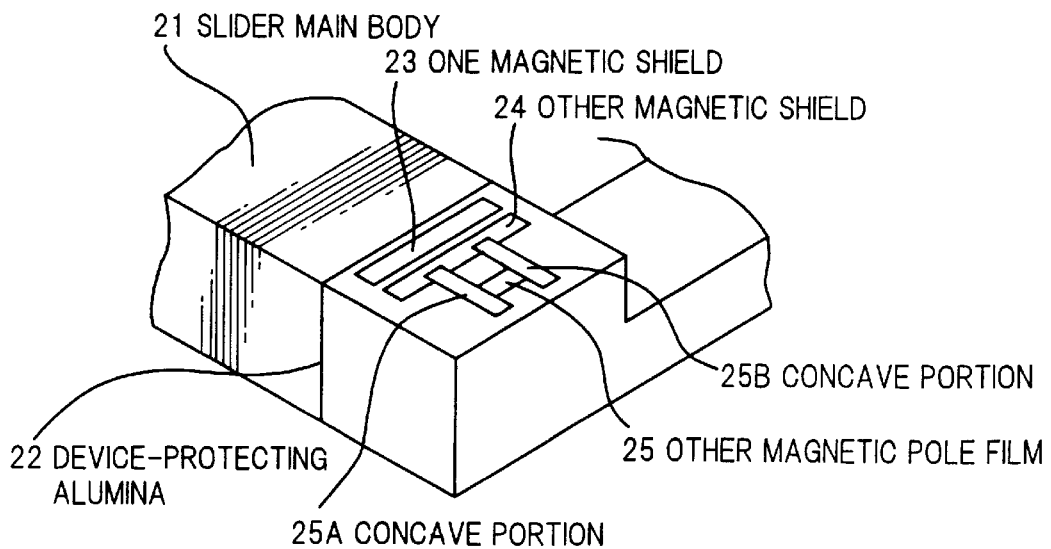
FIG. 11 is an enlarged perspective view showing head elements in FIG. 10.

In FIG. 10, 21 is a slider main body which is of composite ceramics composed of alumina and titanium carbide, and 22 is alumina film covering the entire region. 23 and 24 are magnetic shield films for the MR element. 23 corresponds to one magnetic shield film and 24 corresponds to the other magnetic shield film. These magnetic shield films 23, 24 are of NiFe alloy (permalloy) and the thicknesses of magnetic shield films 23 and 24 are set to be 2 $\mu$m and 3 $\mu$m, respectively.

There is disposed a MR element between the magnetic shield films 23, 24, which has a composition and function similar to those in FIG. 8. The MR element in the second embodiment, which has a composition and function similar to those in the first embodiment, has a center region whose width is set to be 0.5 $\mu$m.

Corresponding to the other magnetic shield film 24 which also functions as one magnetic pole of the ID head, the other magnetic pole film 25 of NiFe is formed through the magnetic gap $G_{ID}$ of alumina.

Like the first embodiment, concave portions 25A, 25B which are formed on both sides of the other magnetic pole film 25 so that the width of the other magnetic pole film 25 is defined to be 0.7 $\mu$m.

Further, the concave portions 25A, 25B formed on both sides of the other magnetic pole film 25 are extending so that they penetrate linearly into one magnetic pole film (other magnetic shield film) 24 beyond the magnetic gap $G_{ID}$ for recording. In the concave portions 25A, 25B, alumina films 25A$a$, 25B$a$ are buried. The concave portions 25A, 25B where the alumina films 25A$a$, 25B$a$ are buried are 0.8 $\mu$m in depth, 2 $\mu$m in width and 0.7 $\mu$m in height in the side surface which is formed penetrating into one magnetic pole film 24 by the concave portions 25A, 25B and is common to a side surface of the other magnetic pole film 25.

About 2 $\mu$m behind from the ABS plane of one magnetic pole film (other magnetic shield film) 24 and the other magnetic pole film 25, there is formed a Cu coil (not shown) which is isolated by a photoresist material. By flowing a current through the Cu coil, a recording magnetic field is generated at the magnetic gap $G_{ID}$.

A method of the merged head device in the second embodiment will be explained in FIG. 12.

In FIG. 12, Step 1 shows a wafer process. In this wafer process, on a wafer composed of composite ceramics (hereinafter referred to as 'altic') of alumina and titanium carbide, the two magnetic shield films 23, 24 which are close disposed and a MR unit composed of the MR element which is disposed through the magnetic separating layer of an insulator between the two magnetic shield films 23, 24 are formed.

Also formed in the wafer process (Step 1) is a ID element where the other magnetic shield film 24 of the two magnetic shield films 23, 24 is used as one magnetic pole film, the coil to be sandwiched by an insulator and the other magnetic pole film 25 are formed parallel with one magnetic pole film 24 on a plane on the other side of the magnetic pole film 24 where the MR element does not exist, and the recording is conducted by magnetic field which generates at the magnetic gap $G_{ID}$ to be given between one magnetic pole film 24 and the other magnetic pole film 25.

After Step 1, as shown in FIG. 12, Step 2 (bar cutting process) where the wafer is cut off to form into a bar, Step 3 (ABS surface rough polishing process) where a surface of the bar opposite to the medium is polished, and Step 4 (concave portion forming process) where the concave portions 25A, 25B for controlling the width of the other magnetic pole film 25 exposed to the medium opposing surface are formed on both sides of the magnetic pole film 25 are conducted in this order.

In this embodiment, the concave portion forming process in Step 4 is conducted by using focused ion beam (FIB) since it needs a high precision.

Further, as shown in FIG. 12, Step 5 (concave portion burying film forming process) where alumina films (filled alumina films) 25A$a$, 25B$a$ to be buried into the concave portions 25A, 25B are formed, and then Step 6 (pole height lapping process) where the ABS surface on which nonmagnetic film is formed is polished to define a depth of the MR element and the other magnetic pole film 25 from the medium opposing surface are conducted. Then, in Step 7, completely burying the concave portions 25A, 25B, thereafter the slider is processed. Thereby, the merged head device in FIG. 10 is obtained.

The recording and reproducing characteristics of the merged head device in the second embodiment are tested as compared with the case (prior art in FIG. 1) that no filler including the filled alumina film is buried into the concave portions 25A, 25B on both sides of the other magnetic pole film 25. In the merged head device of the second embodiment, a good narrow track recording characteristic can be obtained by the other magnetic pole film 25 which is defined to a narrow width by forming the concave portions. Also, by the concave portions 25A, 25B on both sides of the other magnetic pole film 25, a failure in alignment of the MR element and ID element can be corrected, thereby improving the production yield.

In the conventional merged head device where no filler is buried into the concave portions 25A, 25B, the recording characteristic is equal to that of the merged head device in the second embodiment. However, the ABS surface tends to be contaminated and a head crash occurs frequently since a medium lubricant or micro particles are caught in the concave portions formed on the magnetic pole end.

On the contrary, in the second embodiment, by forming the side surface through one and the other magnetic pole films 24, 25, a good side-fringing characteristic can be obtained. Furthermore, though the clearance between the ABS surface and the magnetic medium is so narrow applying to high-density recording, the ABS surface is hard to be contaminated. Therefore, the occurrence of head crash can be prevented effectively.

Meanwhile, this invention can be also applied to a head where high Bs film is provided nearby recording gap film, whereby like effects can be obtained. The high Bs film is preferably composed of Co-system amorphous film such as CoTaZr film, FeN-system film or FeML-system film where M is of at least one element selected from Ta, Zr, Nb, Hf, Mo and Ti and L is of at least one element selected from nitrogen, carbon, boron and oxygen.

Also, the material to be buried into the concave portions 15A, 15B (25A, 25B) may be of oxides other than alumina, e.g., $SiO_2$, $Ta_2O_5$, whereby like effects can be obtained. Alternatively, nitride, carbides and metals which are non-magnetic may be effectively used other than oxides.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A merged head device, comprising:

a slider main body having an air bearing surface to a magnetic medium;

two magnetic shield films disposed parallel on a common plane, spaced apart at a predetermined interval and orthogonal to a direction of air flow on a downstream side of said air bearing surface of said slider main body;

a magnetoresistive effect head disposed through a magnetic separating layer of an insulator between said two magnetic shield films;

an inductive head consisting of a first magnetic pole film corresponding to one of said two magnetic shield films located on said downstream side and a second magnetic pole film disposed through a magnetic gap on said downstream side of said first magnetic pole film wherein recording is effected by a magnetic field generated at said magnetic gap; and concave portions within said common plane on each of two sides parallel to said direction of air flow of said second magnetic pole film along said direction of air flow which define a width of said second magnetic pole film;

wherein said concave portions are filled with a non-magnetic material, such that particles, such as dust, are unable to accumulate within said concave portions.

2. A merged head device, according to claim 1, wherein:

said concave portions penetrate into part of said first magnetic pole film.

3. A merged head device, according to claim 2, wherein:

said non-magnetic material is of oxide.

4. A merged head device, according to claim 2, wherein:

said non-magnetic material is of alumina.

5. A merged head device, according to claim 1, wherein:

said non-magnetic material is of alumina.

6. A merged head device, according to claim 1, wherein:

said non-magnetic material is of oxide.

* * * * *